US006619085B1

(12) United States Patent
Hsieh

(10) Patent No.: US 6,619,085 B1
(45) Date of Patent: Sep. 16, 2003

(54) REMOTE-CONTROLLED LOCK

(76) Inventor: Hui-Hua Hsieh, P.O. Box 90, Tainan City (TW)

( * ) Notice: Subject to any disclaimer, the term of this patent is extended or adjusted under 35 U.S.C. 154(b) by 0 days.

(21) Appl. No.: 10/241,691

(22) Filed: Sep. 12, 2002

(51) Int. Cl.[7] .......................... B60R 25/04; E05B 65/12

(52) U.S. Cl. .......................... 70/257; 292/144; 70/256; 70/280; 70/275

(58) Field of Search .......................... 70/257, 256, 280, 70/281, 282, 275, 277; 292/144

(56) References Cited

U.S. PATENT DOCUMENTS 4,677,834 A * 7/1987 Hicks .......................... 70/279.1
4,929,003 A * 5/1990 McConnell .................. 292/144
4,987,968 A * 1/1991 Martus et al. .............. 180/272
5,020,345 A * 6/1991 Gartner et al. ................ 70/277
5,339,662 A * 8/1994 Goldman ..................... 70/277
5,584,206 A * 12/1996 Ohta ............................ 74/89
5,626,039 A * 5/1997 Solari et al. ............... 70/279.1
5,852,944 A * 12/1998 Collard et al. ............. 70/278.7
5,862,693 A * 1/1999 Myers et al. .............. 70/278.1
5,943,888 A * 8/1999 Lawson ..................... 70/278.7
5,987,818 A * 11/1999 Dabideen ...................... 49/280
6,012,310 A * 1/2000 Hsiao ......................... 70/278.2
6,035,676 A * 3/2000 Hudspeth ................... 70/278.1
6,076,870 A * 6/2000 Frolov ................... 292/341.16
6,079,755 A * 6/2000 Chang ......................... 292/144
6,112,563 A * 9/2000 Ramos ...................... 70/278.1
6,216,502 B1 * 4/2001 Cannella et al. .............. 70/277
6,381,999 B1 * 5/2002 Doong ........................ 70/107

* cited by examiner

*Primary Examiner*—Anthony Knight
*Assistant Examiner*—John B. Walsh

(57) ABSTRACT

A remote-controlled lock includes a shell, an engage base, a fix base, a motor, a circuit board, an actuating member, a passive member and a spring. The circuit board receives a locking signal from a remote controller and starts the motor to rotate clockwise together with the actuating member, which pushes the passive member to move outward and has its projections engaged with the projections of the passive member, which compresses the spring to force its deadbolt extend outward and inserted in the insert groove of the engage base to finish locking of the lock. The circuit board receives an unlocking signal and starts the motor to rotate reversely together with the actuating member, letting the passive member moved inward by the recovering resilience of the spring and the deadbolt disengaged from the insert groove of the engage base to finish unlocking of the lock.

2 Claims, 6 Drawing Sheets

REMOTE-CONTROLLED LOCK

BACKGROUND OF THE INVENTION

1. Field of the Invention

This invention relates to a remote-controlled lock, particularly to one in which a motor is controlled by a remote controller to rotate clockwise together with an actuating member to push a passive member to move forward and have its deadbolt extend outward and inserted in the engage groove of an engage base to finish locking of the remote-controlled lock, having excellent effect of anti-theft.

2. Description of the Prior Art

A conventional door lock, as shown in FIG. 1, includes a housing 10 provided inside with a lock base 11. The lock base 11 is provided at one side with lock rods 110 able to extend out of the through hole 100 in the sidewall of the housing 10 and be inserted in an elongate groove 141 in the sidewall of a bolt base 140 on a doorjamb 14. Besides, the lock base 11 has a lock core 111 with a keyhole 112 provided respectively at the inner and the outer side. A pull plate 12 is fitted in the inner side wall of the housing 10, having a fixing plate 120 inserted in the slide groove 101 of the housing 10 and contacting the fixing plate 102 of the housing 10. In addition, the housing 10 is provided inside with a deadbolt 13 having one end inserted through the fixing plate 102 of the housing 10 and secured with the fixing plate 120 of the pull plate 12, with a spring 130 fitted around one end of the deadbolt 13 near the pull plate 12. The deadbolt 13 has the other end fixed with a stopper 131 able to extend out of a through hole 103 in the sidewall of the housing 10 and be inserted in the elongate groove 141 in the sidewall of the bolt base 140 of the doorjamb 14. Thus, a key is inserted in the keyhole 112 of the lock core 111 and turned around to drive the lock rods 110 and the stopper 131 to move inward toward the housing 10 and be disengaged from the elongate groove 141 of the bolt base 140 of the doorjamb 14 to finish unlocking of a door lock.

However, a conventional door lock has its lock rods 110 locked only by a key, therefore it is easy to be unlocked by common unlocking tools, having hardly effect of anti-theft.

SUMMARY OF THE INVENTION

The objective of the invention is to offer a remote-controlled lock having excellent effect of anti-theft.

The feature of the invention is a shell to be fixed on a door, formed inside with a chamber having two opposite projecting bars on the inner wall and two position plates in the interior. The shell has one end bored with a through hole communicating with the chamber and having a lengthwise projection on the inner wall and a battery box positioned protruding-out on the side wall for fitting batteries therein and a plurality of fixing lugs fixed on the bottom edge, with each fixing lug bored with an insert hole for a bolt to be inserted therein. Further, an engage base is secured on a doorjamb, having an insert groove inside and two fixing lugs fixed on the opposite sides, with each fixing lug having an insert hole for a bolt to be inserted therein. A fix base is installed in the chamber of the shell, having two engage grooves respectively provided at the opposite sides, and a shaft hole bored in the center and two insert holes positioned oppositely, with a bolt inserted in each insert hole. A motor is positioned in the chamber of the shell, having its spindle inserted through the shaft hole of the fix base. A circuit board is disposed in the chamber of the shell, and an actuating member is installed in the chamber of the shell, provided at one side with a horizontal projecting stud having a lateral insert hole inside and a vertical threaded hole in the wall to communicate with the lateral insert hole for receiving a bolt therein. The actuating member further has two projections respectively fixed on the opposite walls, a coupling groove formed in the opposite walls of the two projections and two cut slopes respectively provided at the opposite walls of the coupling groove. A passive member is fitted in the chamber of the shell to contact the actuating member, having two projections respectively fixed on the opposite walls, a coupling groove formed in the opposite walls of the two projections, two cut slopes respectively provided at the opposite walls of the coupling groove and a deadbolt with a lengthwise groove secured on the one end. Lastly, a spring is fitted around the deadbolt of the passive member.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
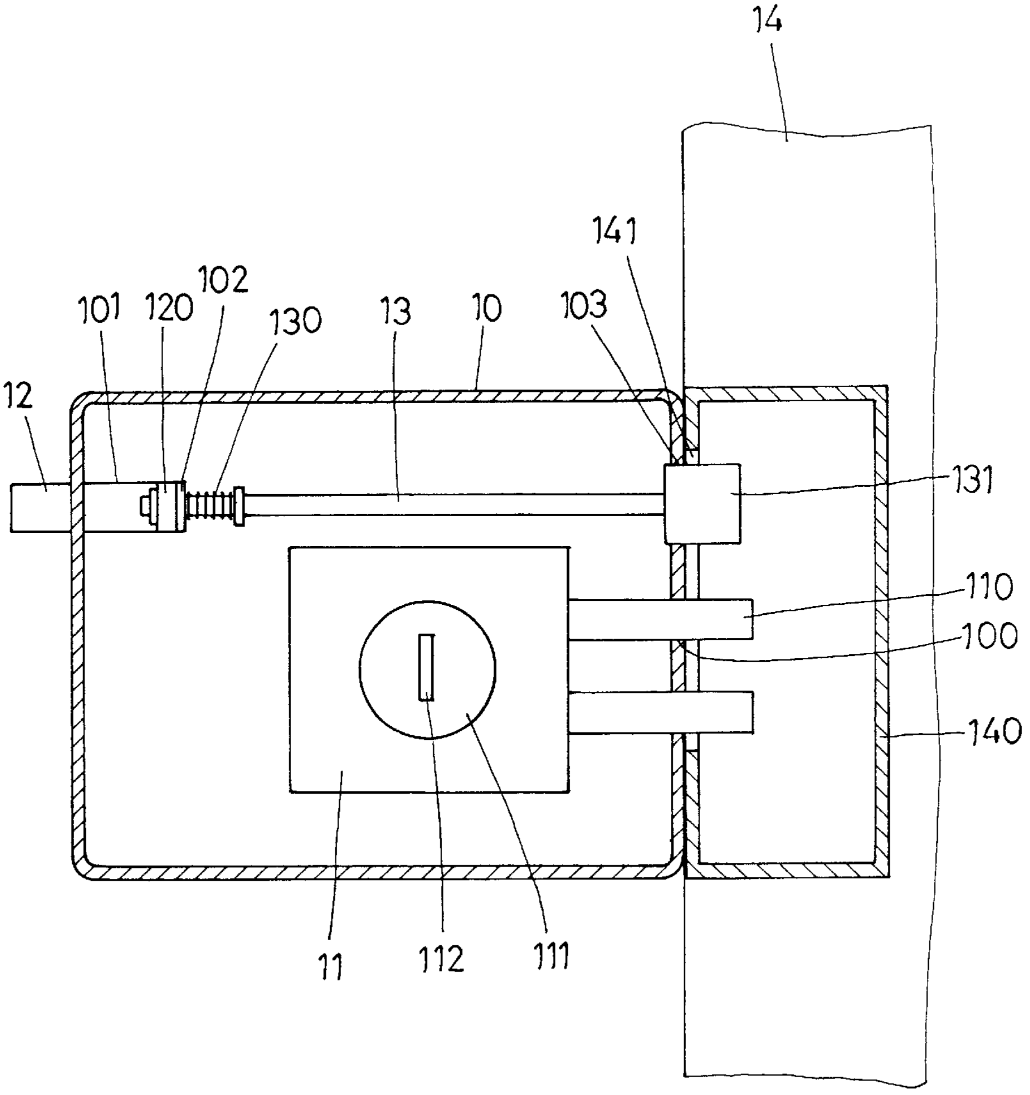
FIG.1 (PRIOR ART)
FIG. 1 is a front view of a conventional door lock.
Figure 2:
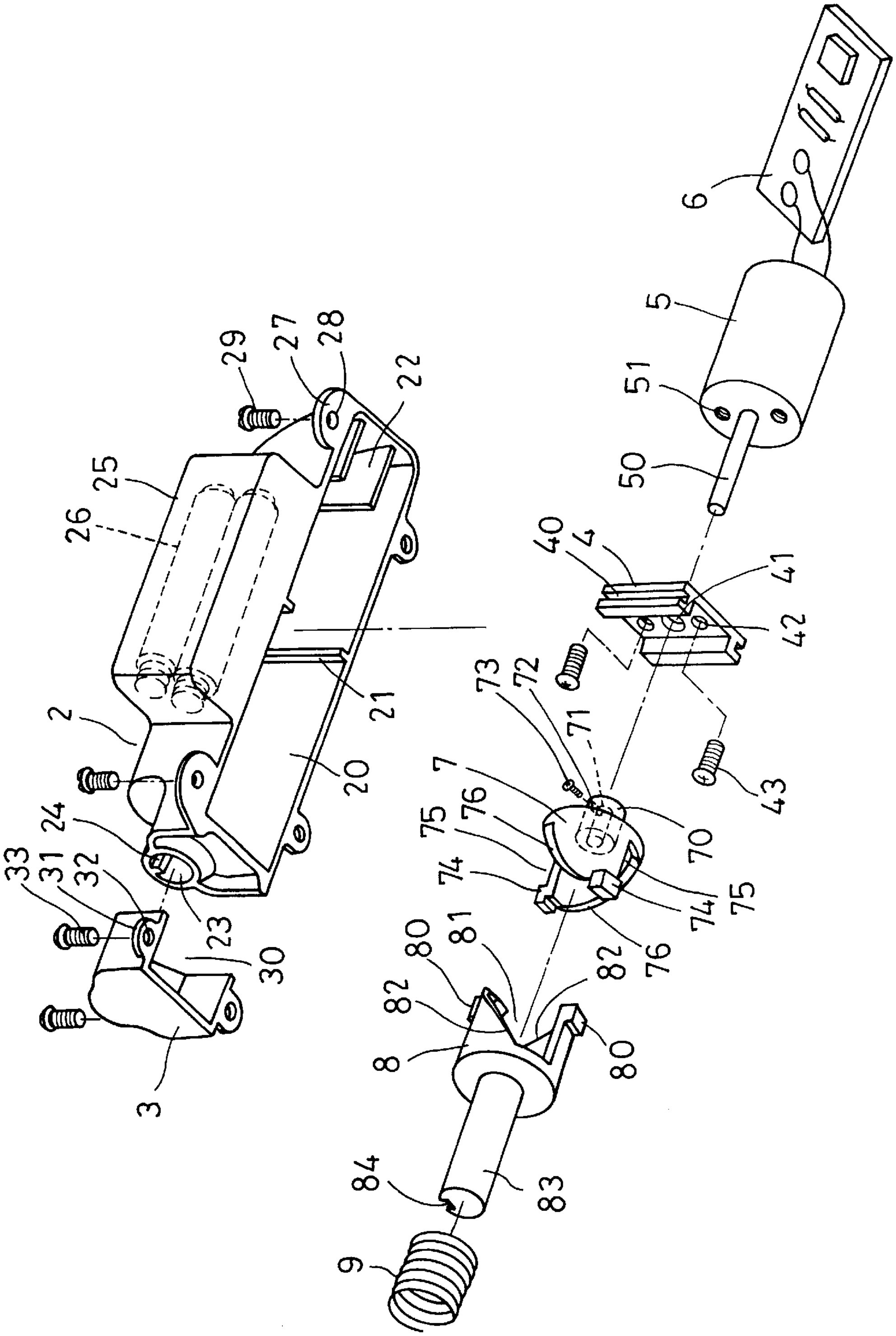
FIG. 2 is an exploded perspective view of a remote-controlled lock in the present invention.

A preferred embodiment of a remote-controlled lock in the present invention, as shown in FIG. 2, includes a shell 2, an engage base 3, a fix base 4, a motor 5, a circuit board 6, an actuating member 7, a passive member 8 and a spring 9 as main components combined together.

The shell 2 is formed inside with a chamber 20 having two projecting bars 21 positioned oppositely on the inner wall and two position plates 22 in the interior. The shell 2 has one end bored with a through hole 23 communicating with the chamber 20 and having a lengthwise projection 24 secured on the inner wall. Besides, the shell 2 has a battery box 25 provided protruding-out on a sidewall for receiving batteries 26 therein and a plurality of fixing lugs 27 fixed on a bottom edge and respectively having an insert hole 28.

The engage base 3 to be secured on a doorjamb 14 is provided with an insert groove 30 inside and two fixing lugs 31 respectively fixed on opposite bottom edges and respectively having an insert hole 32 for a bolt 33 to be inserted therein.

The fix base 4 to be installed in the chamber 20 of the shell 2 is provided with an engage groove 40 at opposite sides, a shaft hole 41 in the center and two inset holes 42 positioned oppositely for receiving a bolt 43 respectively.

The motor 5 to be deposited in the chamber 20 of the shell 2 has its spindle 50 inserted through the shaft hole 41 of the fix base 4 and is bored with two threaded holes 51 in the front wall.

The circuit board 6 is to be positioned in the chamber 20 of the shell 2.

The actuating member 7 to be disposed in the chamber 20 of the shell 2 is provided on one side with a horizontal projecting stud 70 having a lateral insert hole 71 and a vertical threaded hole 72 in the wall to communicate with the insert hole 71 and receive a bolt 73 therein. The actuating member 7 further has two projections 74 positioned oppositely on the wall, a coupling groove 75 cut in the opposite walls of the two projections 74 and two cut slopes 76 respectively provided on the opposite walls of the coupling groove 75.

The passive member 8 to be fitted in the chamber 20 of the shell 2 to contact with the actuating member 7 has two projections 80 respectively positioned on the opposite walls, a coupling groove 81 cut in the opposite walls of the projections 80 and two cut slopes 82 respectively provided on the opposite walls of the coupling groove 81. The passive member 8 further has one end secured with a deadbolt 83 having a lengthwise groove 84 in its surface.

The spring 9 is fitted around the deadbolt 83 of the passive member 8.

Figure 3:
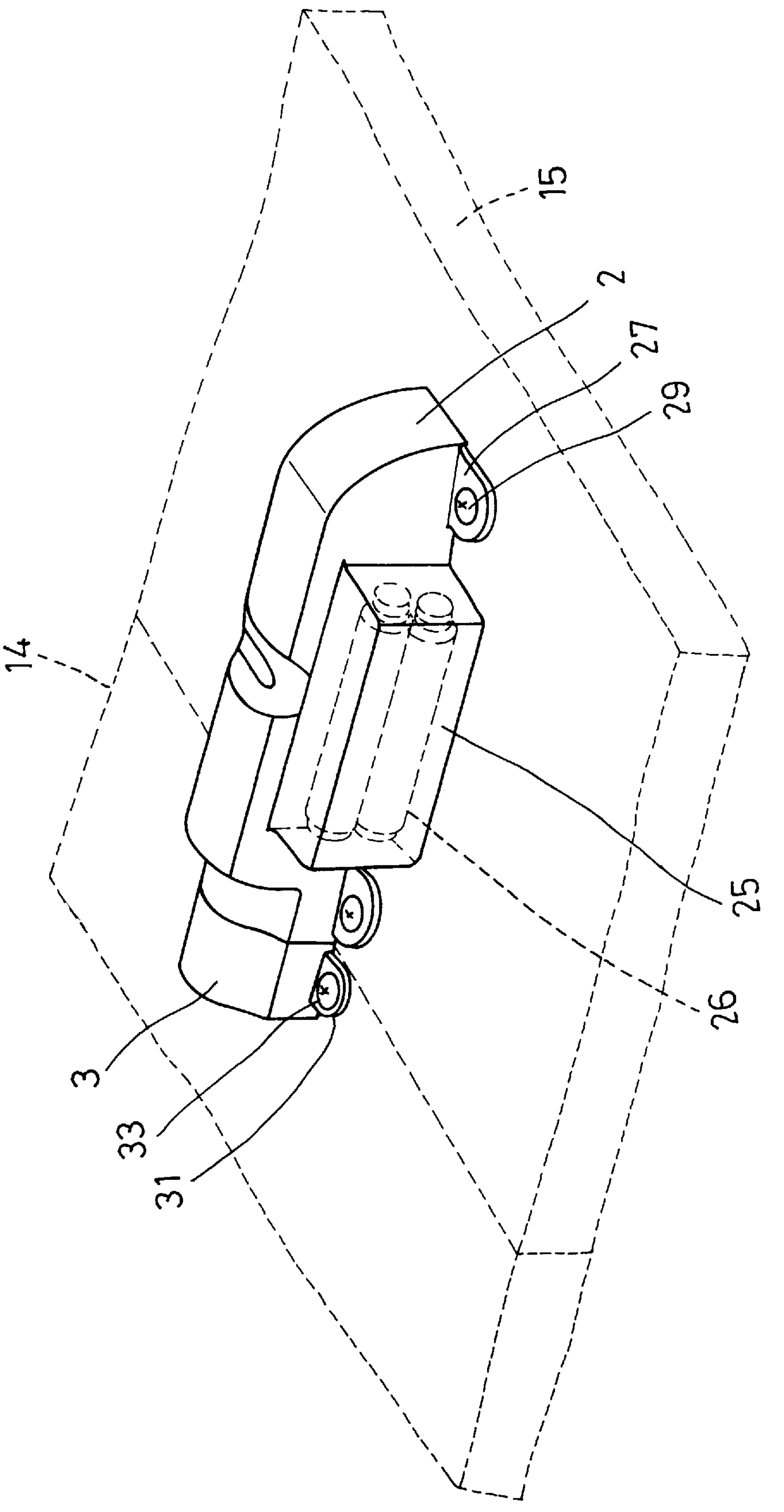
FIG. 3 is perspective view of the remote-controlled lock assembled on a door in the present invention.
Figure 4:
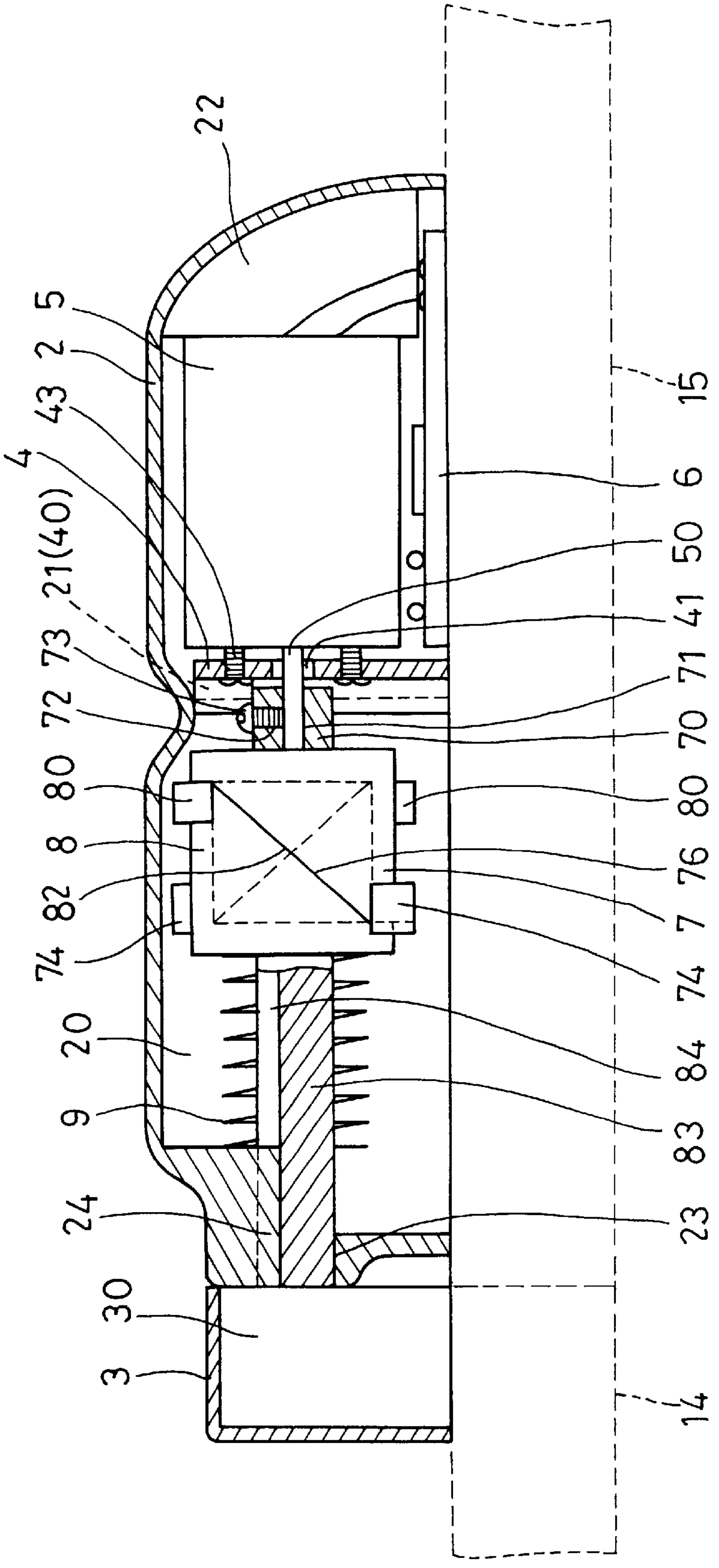
FIG. 4 is a cross-sectional view of the remote-controlled lock in an unlocking condition in the present invention.

In assembling, as shown in FIGS. 2, 3 and 4, firstly, the motor 5 has its spindle 50 inserted through the shaft hole 41 of the fix base 4 and fix the motor 5 together with the fix base 4 by means of bolts 43 respectively inserted through the insert holes 42 of the fix base 4 and screwed with the threaded holes 51 of the motor 5. Then, the spindle 50 of the motor 5 is inserted in the lateral insert hole 71 of the projecting stud 70 of the actuating member 7, which is then secured on the spindle 50 by a bolt 73 inserted in the threaded hole 72 of the projecting stud 70 to hold firmly the spindle 50 firmly therein, and subsequently, the spring 9 is fitted around the deadbolt 83 of the passive member 8.

Next, the assembled components mentioned above are together disposed in the chamber 20 of the shell 20 to let the deadbolt 83 of the passive member 8 inserted in the through hole 23 of the shell 2 and the lengthwise groove 84 of the deadbolt 83 engaged with the lengthwise projection 24 on the inner wall of the through hole 23. The spring 9 has one end resting against the inner wall of the chamber 20 and the other end pushing against the front wall of the passive member 8, and force the passive member 8 to closely contact with the actuating member 7, letting the cut slopes 76 and 82 of the actuating member 7 and the passive member 8 lean against each other. Further, the fix base 4 has its engage grooves 40 engaged with the projecting bars 21 in the chamber 20 of the shell 2, and the motor 5 is held in position by the two position plates 22 in the chamber 20.

Lastly, the circuit board 6 is installed in the chamber 20, the shell 2 is secured on a door 15 by bolts 29 respectively inserted through the insert holes 28 of the fixing lugs 27 of the shell 2 and fixed firmly on the door 15, and the engage base 3 is secured on a doorjamb 14 by bolts 33 respectively inserted through the insert holes 32 of the fixing lugs 31 of the engage base 3 and fixed on the doorjamb 14, letting the insert groove 30 of the engage base 3 aligned to the through hole 23 of the shell 2 secured on the door 15.

Figure 5:
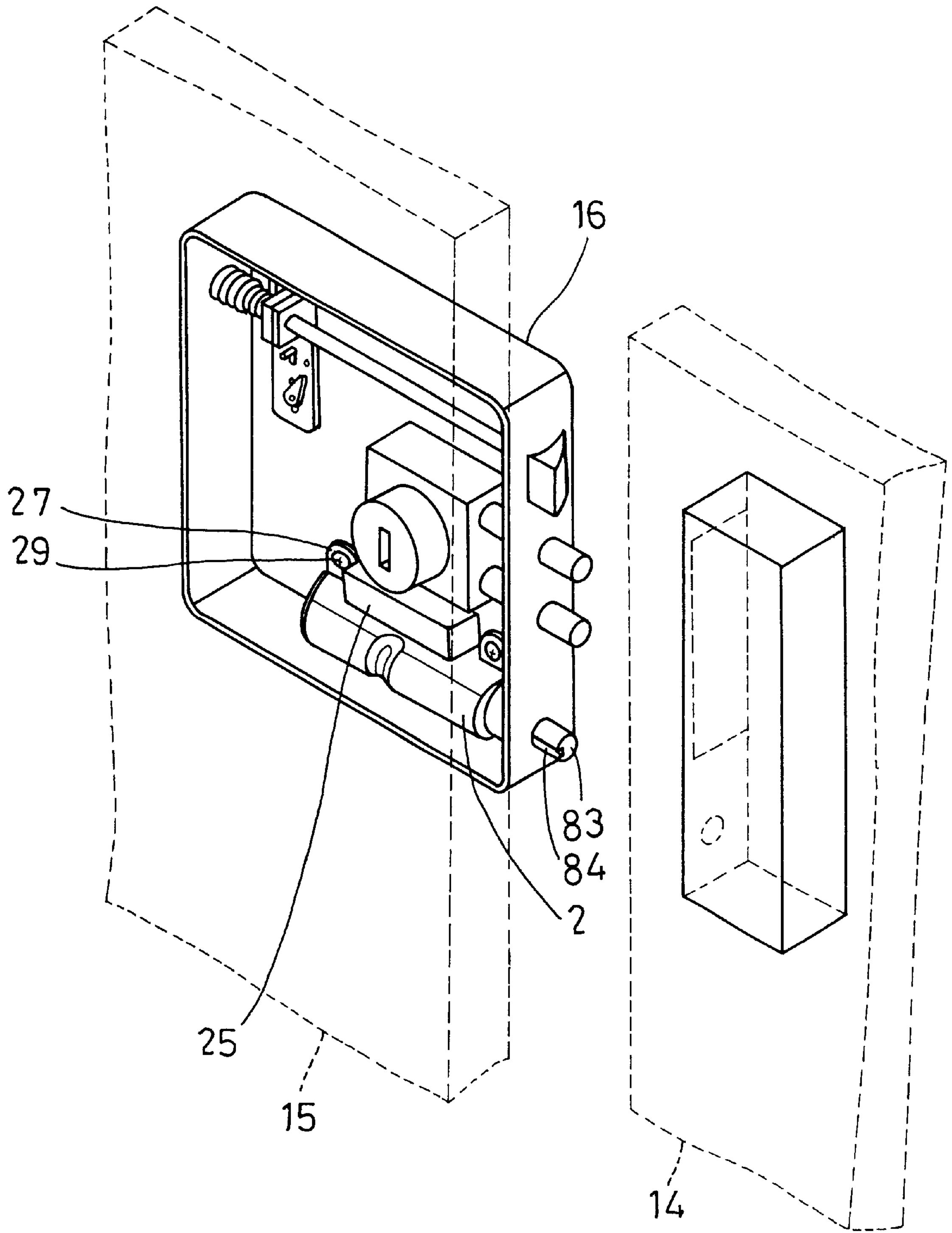
FIG. 5 is a perspective view of the remote-controlled lock assembled in a common door lock in the present invention; and, FIG. 6 is cross-sectional view of the remote-controlled lock in a locked condition in the present invention.
Figure 6:
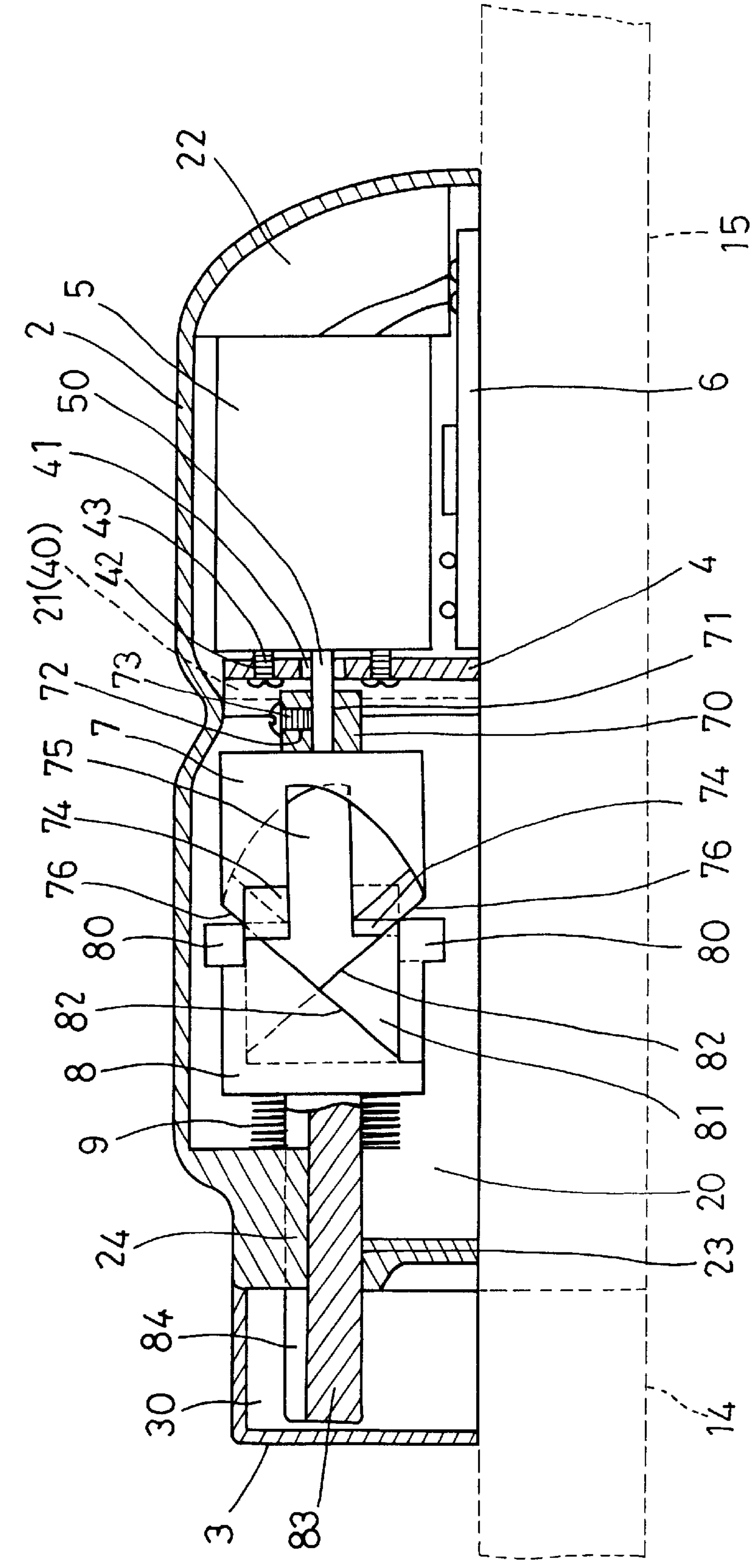

In using, as shown in FIGS. 3, 4, 5 and 6, the remote-controlled lock in the invention can be independently installed on the panel of a door 15 to be controlled and locked by a remote controller, as shown in FIG. 3, or can be additionally provided within any door lock 16 to be locked by both a remote controller and a key, having double function of anti-theft, as shown in FIG. 5. To lock the remote-controlled lock, only press the locking button of a remote controller to send out a locking signal to the circuit board 6, which receives the signal and starts the motor 5 to rotate clockwise. Synchronously, the spindle 50 of the motor 5 rotates and drives the actuating member 7 to rotate clockwise, but the passive member 8 does not rotate with the actuating member 7 because it is confined in position by the lengthwise projection 24 of the shell 2. As the cut slopes 76 of the actuating member 7 and the cut slopes 82 of the passive member 8 lean against each other, therefore when the actuating member 7 rotates clockwise, the passive member 8 will be pushed to move outward and compress the spring 9 to have the outer end of its deadbolt 83 extend out of the through hole 23 of the shell 2 and inserted in the insert groove 30 of the engage base 3 on a doorjamb 14, as shown in FIG. 6. And the actuating member 7 keeps on rotating to have its opposite projections 74 engaged in position with the opposite projections 80 of the passive member 8 to finish locking of the remote-controlled lock. Thus, the door 15 is impossible to be unlocked before the deadbolt 83 is released by a remote controller.

To unlock the remote-controlled lock, simply press the unlocking button of a remote controller to send out an unlocking signal to the circuit board 6, which, on receiving the signal, starts the motor 5 to rotate reversely. Simultaneously, the motor 5 has its spindle 50 drive the actuating member 7 to rotate reversely, and at this time the passive member 8 is pushed back to its original position to contact the actuating member 7 again by the recovering resilience of the spring 9, and the deadbolt 83 is moved back into the through hole 23 of the shell 2 and disengaged from the insert groove 30 of the engage base 3 to finish unlocking of the remote-controlled lock, as shown in FIG. 4, convenient in handling and having excellent effect of anti-theft.

While the preferred embodiment of the invention has been described above, it will be recognized and understood that various modifications may be made therein and the appended claims are intended to cover all such modifications that may fall within the spirit and scope of the invention.

What is claimed is:

1. A remote-controlled lock comprising:

a shell to be fixed on a door, said shell formed with a chamber in its interior, said chamber having two projecting bars positioned oppositely on the inner wall, said chamber further provided inside with two position plates, said shell having one end bored with a through hole communicating with said chamber, said through hole fixed with a lengthwise projection on the inner wall, said shell having one side wall provided with a protruding-out battery box for receiving batteries therein, said shell further fixed with a plurality of fixing lugs on a bottom edge, each said lug having an insert hole for a bolt to be inserted therein;

an engage base to be secured on a doorjamb, said engage base formed inside with an insert groove, said engage base having two fixing lugs respectively secured on the opposite bottom edges, each said fixing lug having an insert hole for a bolt to be inserted therein;

a fix base to be disposed in said chamber of said shell, said fix base having two engage grooves respectively provided in the opposite edges, said fix base bored with a shaft hole in the center, said fix base further having two insert holes bored oppositely, each said insert hole receiving a bolt therein;

a motor to be positioned in said chamber of said shell, said motor having its spindle inserted through said shaft hole of said fix base;

a circuit board to be installed in said chamber of said shell;

an actuating member to be fitted in said chamber of said shell, said actuating member provided with a horizontal projecting stud having a lateral insert hole inside, said projecting stud bored in the wall with a vertical threaded hole, said vertical threaded hole communicating with said lateral insert hole, a bolt inserted in said vertical threaded hole, said actuating member having two projections respectively fixed on the opposite walls, said actuating member having a coupling groove cut in the opposite walls of said two projections, said actuating member further provided with two cut slopes on the opposite walls of said coupling groove;

a passive member to be positioned in said chamber of said shell, said passive member contacting said actuating member in said chamber, said passive member having two projections respectively secured on the opposite walls, said passive member having a coupling groove bored in the opposite walls of said two projections, said passive member having two cut slopes respectively provided on the opposite walls of said coupling groove, said passive member further fixed with a deadbolt at one end, said deadbolt bored with a lengthwise groove in the wall;

a spring fitted around said deadbolt of said passive member; and, a locking button of a remote controller pressed to send out a locking signal, said circuit board receiving said signal and starting said motor to rotate clockwise, said motor driving said actuating member to rotate clockwise, said passive member pushed to move outward by said cut slopes of said actuating member, said actuating member keeping on rotating to have its said projections engaged in position with said projections of said passive member, said passive member compressing said spring and forcing said deadbolt extend outward, said deadbolt inserted in said insert groove of said engage base to finish locking of a remote-controlled lock, an unlocking button of said remote controller pressed to send out an unlocking signal to unlock said remote-controlled lock, said circuit board receiving said unlocking signal and starting said motor to rotate reversely, said motor driving said actuating member to rotate reversely, said passive member pushed to move inward by the recovering resilience of said spring, said passive member contacting said actuating member again, said deadbolt of said passive member moved back into said through hole of said shell, said deadbolt disengaged from said insert groove of said engage base to finish unlocking of said remote-controlled lock, convenient in handling and having best effect of anti-theft.

2. The remote-controlled lock as claimed in claim 1, wherein said remote-controlled lock is installed in a common lock, able to be locked by a remote controller and by a key at the same time to obtain excellent effect of anti-theft.

* * * * *